United States Patent [19]

Lemley

[11] Patent Number: 4,819,264

[45] Date of Patent: Apr. 4, 1989

[54] TELEPHONE SANITATION DEVICE

[76] Inventor: James D. Lemley, Rte. One, Woodville, Ala. 35776

[21] Appl. No.: 157,713

[22] Filed: Feb. 19, 1988

[51] Int. Cl.$^4$ .............................................. H04R 1/17
[52] U.S. Cl. ...................................... 379/452; 379/439
[58] Field of Search ................. 379/452, 451, 437, 439

[56] References Cited

U.S. PATENT DOCUMENTS

| D. 45,347 | 3/1914 | Mundt | D14/67 |
|---|---|---|---|
| D. 142,133 | 8/1945 | Woodruff | D26/14 |
| D. 171,161 | 12/1953 | Larabell | D14/67 |
| D. 253,236 | 10/1979 | Hwang | D14/67 |
| 932,545 | 8/1909 | Haff | 379/452 |
| 1,610,659 | 12/1926 | Craig | 379/452 |
| 2,546,229 | 3/1951 | McCloskey et al. | 379/452 |
| 2,659,778 | 11/1953 | Fraschetti | 379/452 |
| 3,001,033 | 9/1961 | Rosenblum | 379/452 |
| 3,148,249 | 9/1964 | King | 379/452 |
| 3,238,313 | 3/1966 | Katogris | 379/452 |
| 3,530,261 | 9/1970 | Guim | 379/452 |
| 4,329,548 | 5/1982 | Strassburg | 379/452 |
| 4,546,215 | 10/1985 | Ferraro | 381/187 |
| 4,613,928 | 9/1986 | Wernert | 379/452 |
| 4,751,731 | 6/1988 | O'Connor | 379/439 |

FOREIGN PATENT DOCUMENTS

| 2316001 | 6/1974 | Fed. Rep. of Germany | 379/439 |
|---|---|---|---|
| 773081 | 11/1934 | France | 379/452 |
| 801074 | 7/1936 | France | 379/452 |
| 2572607 | 5/1986 | France | 379/452 |
| 550216 | 1/1958 | Italy | 379/452 |

*Primary Examiner*—Jin F. Ng
*Assistant Examiner*—Danita R. Byrd
*Attorney, Agent, or Firm*—Jerry T. Kearns

[57] ABSTRACT

A telephone sanitation device is formed from a soft foam pad treated with a disinfectant. The foam pad is secured to a support ring provided with an adhesive backing. In use, the adhesive backing is applied to the base of a telephone, in a position such that the telephone mouthpiece rests against the disinfectant treated foam when the telephone is not in use. The foam and foam support plate may be provided in circular, oval and rectangular configurations, for use with a variety of telephone styles. The disinfectant treated foam may be backed by an absorbent material which continuously supplied disinfectant to the foam by a wicking action. The foam support base may be formed as a cartridge type holder which houses replaceable disinfectant foam pads.

2 Claims, 5 Drawing Sheets

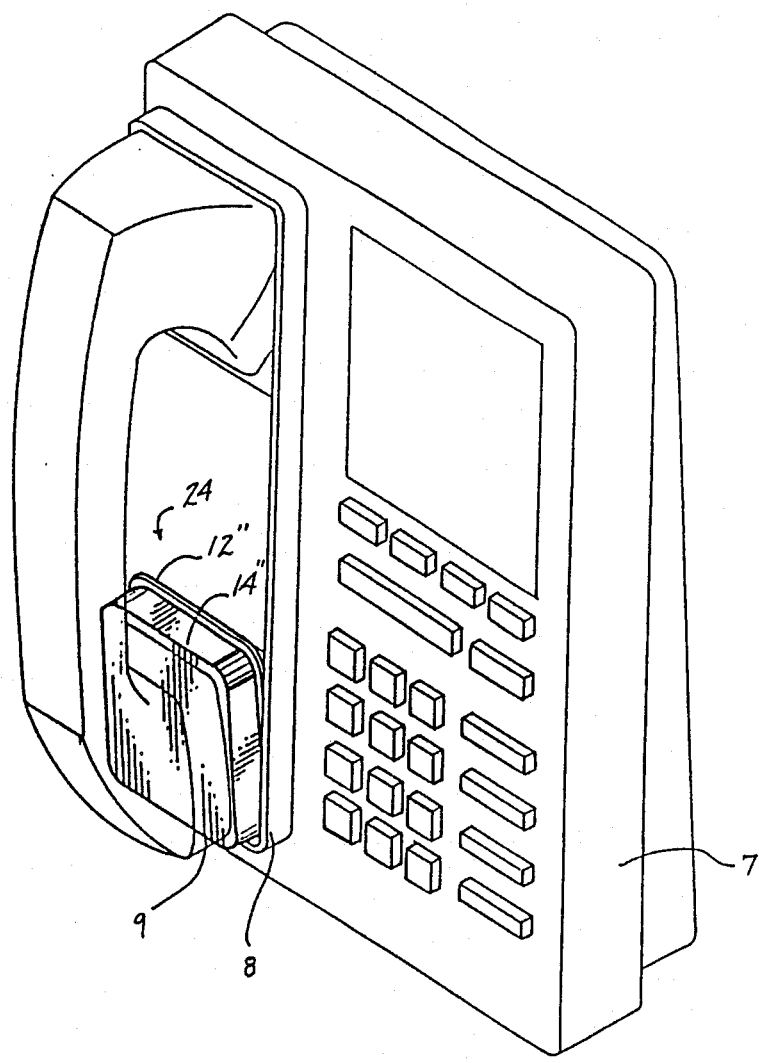

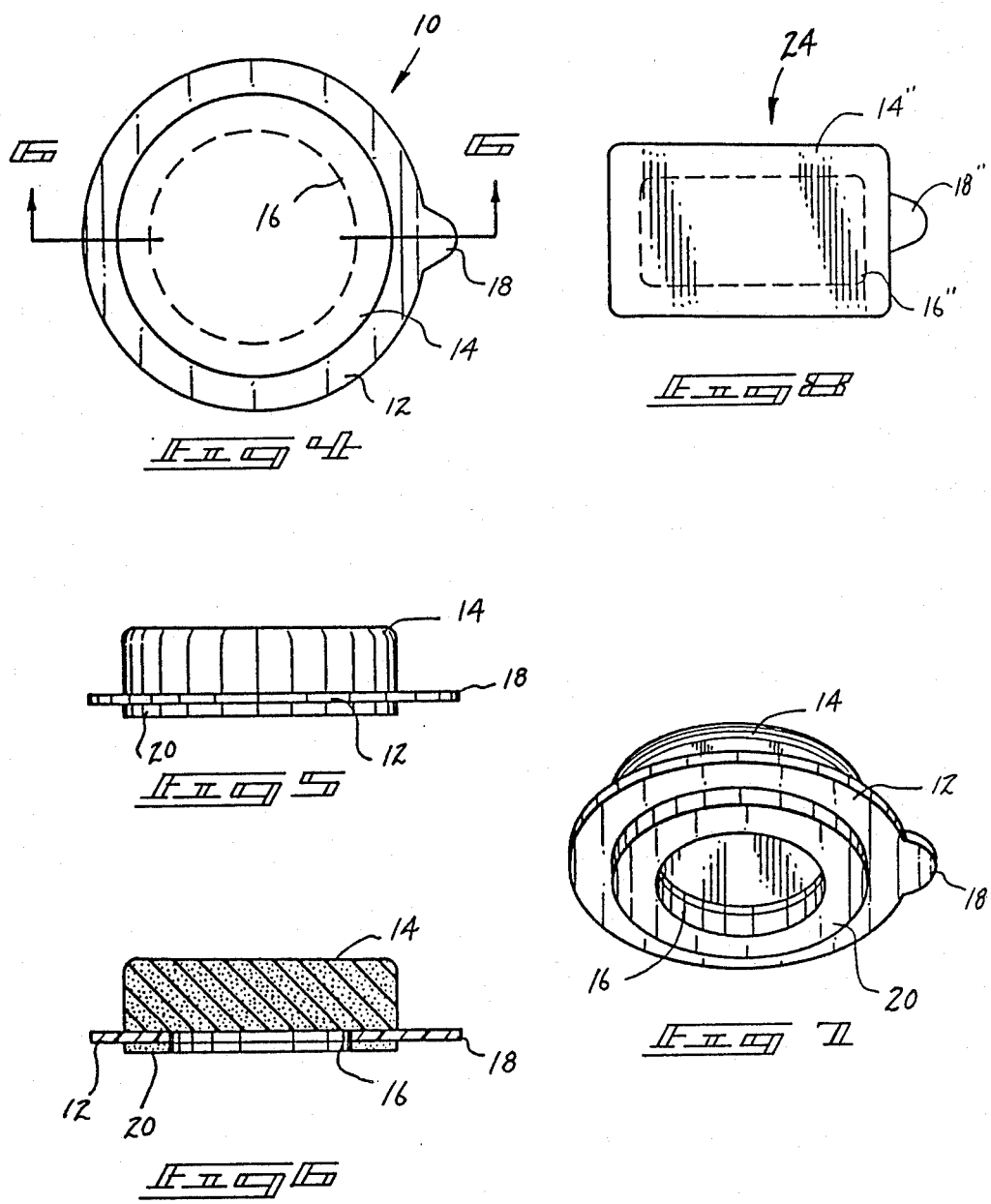

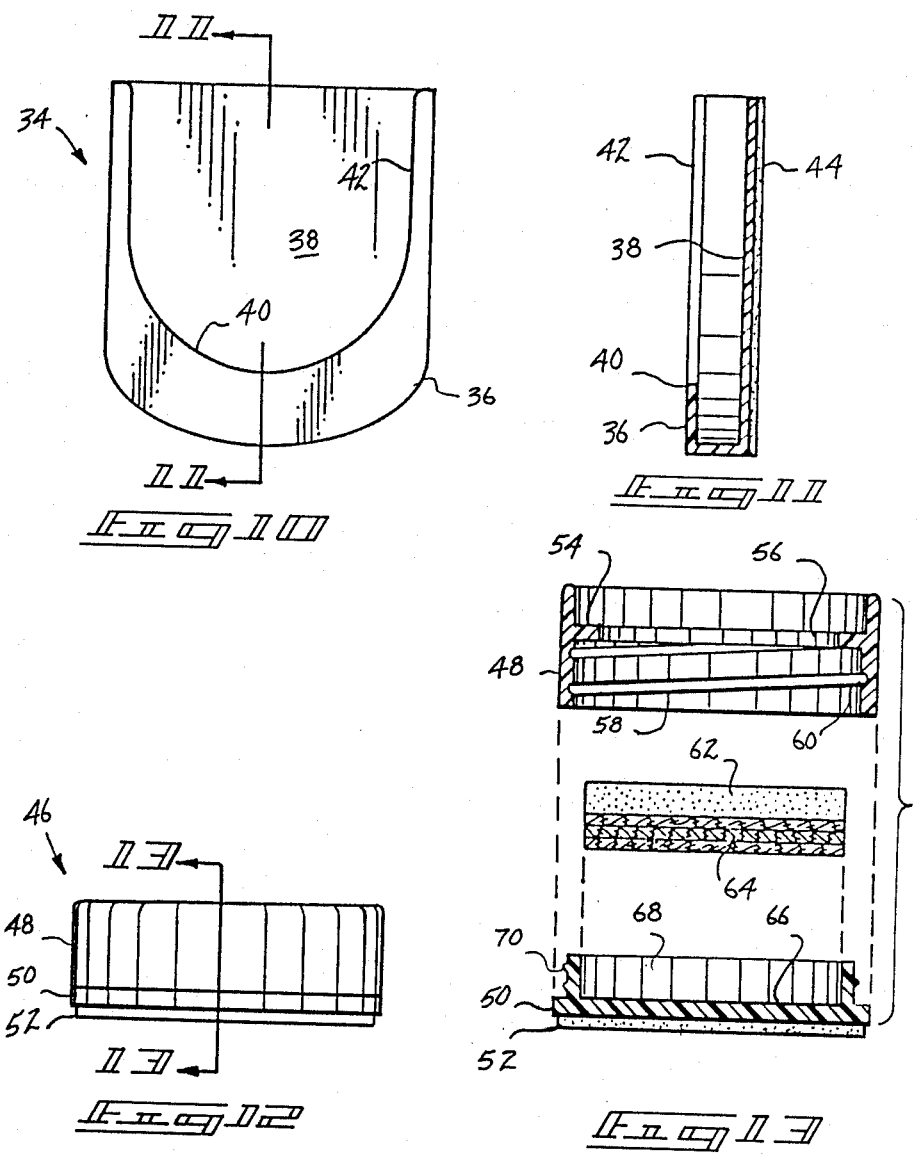

TELEPHONE SANITATION DEVICE

BACKGROUND OF THE INVENTION

1. Field of the Invention

The present invention relates to telephone sanitation devices, and more particularly pertains to a disinfectant treated foam pad adapted to be secured on a phone base in a position such that the phone mouthpiece rests against the disinfectant treated foam pad when not in use. The small holes in the mouthpiece of the telephone are a perfect hiding place for bacteria transmitted by individuals speaking into the phone. The next person using the phone naturally inhales some of the bacteria into their mouth and nostrils. Society is currently quite afraid of contracting various communicable diseases. In order to prevent the transmission of disease between various individual telephone users and to alleviate public fear, the present invention provides a disinfectant pad to sanitize the mouthpiece of a telephone between uses.

2. Description of the Prior Art

Various types of telephone sanitation devices are known in the prior art. A typical example of such a telephone sanitation device is to be found in U.S. Pat. No. Des. 45,347, which issued to C. Mundt on Mar. 3, 1914. This patent discloses a telephone mouthpiece cover formed as a thin flat square sheet. Each corner of the sheet is bent to form a tab for attachment over the mouthpiece of a telephone. The cover is provided with a plurality of sound transmitting apertures. U.S. Pat. No. Des. 142,133, which issued to A. Woodruff on Aug. 14, 1945, discloses an earpiece cover for a telephone receiver which is formed from a flexible foam material. While this device provides added comfort to a telephone user, no sanitary benefits are achieved. U.S. Pat. No. Des. 171,161, which issued to L. Larabell on Dec. 22, 1953, discloses a soft foam cover for a telephone receiver or mouthpiece. U.S. Pat. No. Des. 253,236, which issued to J. Hwang on Oct. 23, 1979, discloses a telephone mouthpiece cover which utilizes a rigid mounting ring provided with an inner fibrous filler. A plurality of tabs are provided about the circular periphery of the cover for engagement with a telephone mouthpiece. U.S. Pat. No. 4,546,215, which issued to M. Ferraro on Oct. 8, 1985, discloses a detachable earmuff for a stereo headset formed of an insulated cover designed to protect a user's ears from the cold.

While the above mentioned devices are suited for their intended usage, none of these devices provide a disinfectant treated foam pad provided with an adhesive backing for securement to a telephone base. Additionally, none of the aforesaid prior art devices provide a disinfectant treated foam pad which utilizes an absorbent material to continuously supply disinfectant through a wicking action to a foam pad. An additional feature of the present invention, not contemplated by the aforesaid prior art devices, is the use of a cartridge holder provided with an adhesive backing for securement to a telephone base to allow usage of replaceable disinfectant foam pads. Inasmuch as the art is relatively crowded with respect to these various types of telephone sanitation devices, it can be appreciated that there is a continuing need for and interest in improvements to such telephone sanitation devices, and in this respect, the present invention addresses this need and interest.

SUMMARY OF THE INVENTION

In view of the foregoing disadvantages inherent in the known types of telephone sanitation devices now present in the prior art, the present invention provides an improved telephone sanitation device. As such, the general purpose of the present invention, which will be described subsequently in greater detail, is to provide a new and improved telephone sanitation device which has all the advantages of the prior art telephone sanitation devices and none of the disadvantages.

To attain this, representative embodiments of the concepts of the present invention are illustrated in the drawings and make use of a soft foam pad treated with a disinfectant. The foam pad is secured to a support ring provided with an adhesive backing. In use, the adhesive backing is applied to the base of a telephone, in a position such that the telephone mouthpiece rests against the disinfectant treated foam when the telephone is not in use. The foam and foam support plate may be provided in circular, oval and rectangular configurations, for use with a variety of telephone styles. The disinfectant treated foam may be backed by an absorbent material which continuously supplies disinfectant to the foam by a wicking action. The foam support base may be formed as a cartridge type holder which houses replaceable disinfectant foam pads.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved telephone sanitation device which has all the advantages of the prior art telephone sanitation devices and none of the disadvantages.

It is another object of the present invention to provide a new and improved telephone sanitation device which may be easily and efficiently manufactured and marketed.

It is a further object of the present invention to provide a new and improved telephone sanitation device which is of a durable and reliable construction.

An even further object of the present invention is to provide a new and improved telephone sanitation device which is susceptible of a low cost of manufacture with regard to both materials and labor, and which accordingly is then susceptible of low prices of sale to the consuming public, thereby making such telephone sanitation devices economically available to the buying public.

Still yet another object of the present invention is to provide a new and improved telephone sanitation device which provides in the apparatuses and methods of the prior art some of the advantages thereof, while simultaneously overcoming some of the disadvantages normally associated therewith.

Still another object of the present invention is to provide a new and improved telephone sanitation device to disinfect a telephone mouthpiece between uses and thus protect individuals from the transmission of communicable diseases.

Yet another object of the present invention is to provide a new and improved telephone sanitation device which utilizes a disinfectant treated foam pad on a support base provided with an adhesive backing for securement to a telephone in a position to contact the mouthpiece of the telephone when not in use.

Even still another object of the present invention is to provide a new and improved telephone sanitation device which utilizes a cartridge holder provided with an adhesive backing for securement to a telephone which receives disposable disinfectant treated foam pads.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a perspective view of a wall mount type telephone provided with a telephone sanitation device according to a third embodiment of the present invention.

FIG. 4 is a top view of the telephone sanitation device according to the first embodiment of the present invention.

FIG. 5 is a side view of the telephone sanitation device of the first embodiment of the present invention.

FIG. 6 is a cross sectional view, taken along line 6—6 of FIG. 4, illustrating the telephone sanitation device according to the first embodiment of the present invention.

FIG. 7 is a perspective view of the telephone sanitation device according to the first embodiment of the present invention.

FIG. 8 is a top view of the telephone sanitation device according to the third embodiment of the present invention.

FIG. 9 is a cross sectional view of a telephone sanitation device according to a fourth embodiment of the present invention. FIG. 10 is a top view of the telephone sanitation device according to a fifth embodiment of the present invention.

FIG. 11 is a cross sectional view, taken along line 11—11 of FIG. 10, illustrating the telephone sanitation device according to the fifth embodiment of the present invention.

FIG. 12 is a side view of a telephone sanitation device according to a sixth embodiment of the present invention.

FIG. 13 is an exploded cross sectional view, taken along line 13—13 of FIG. 12, illustrating the telephone sanitation device according to a sixth embodiment of the present invention.

DESCRIPTION OF THE PREFERRED EMBODIMENT

Figure 1:
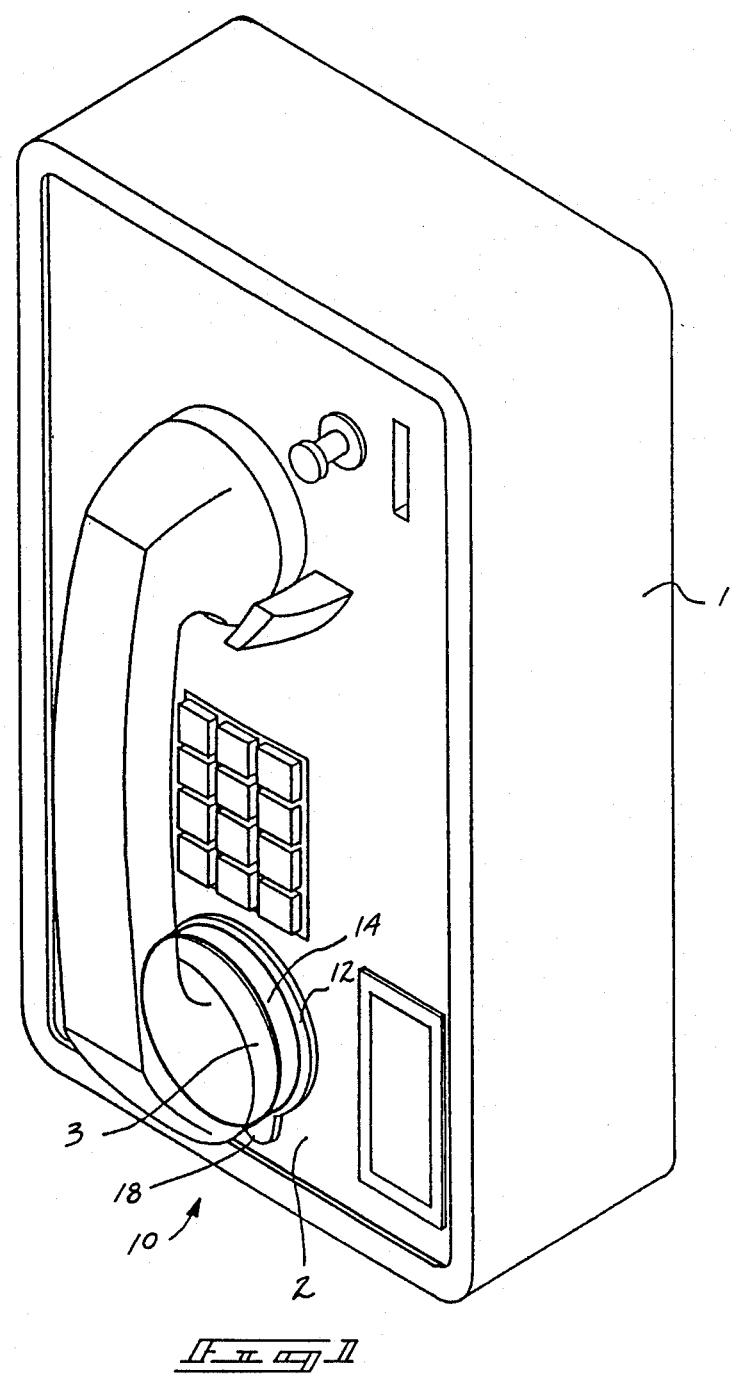
FIG. 1 is a perspective view of a pay public telephone provided with the telephone sanitation device according to a first embodiment of the present invention.

With reference now to the drawings, and in particular to FIG. 1 thereof, a new and improved telephone sanitation device embodying the principles and concepts of the present invention and generally designated by the reference numeral 10 will be described.

More specifically, it will be noted that the first embodiment 10 of the invention includes a circular foam support ring 12 on which a cylindrical disc of soft foam material is mounted. The support ring 12 is provided with an integral radially outwardly extending tab 18, to facilitate removal of the support ring 12 from the front face 2 of a pay public telephone 1. The support ring 12 is provided with an adhesive backing for securing the support ring 12 and attached cylindrical foam disc 14 to the front face 2 of the telephone 1. The foam disc 14 is treated with a disinfectant and is secured in a position on the phone 1 so as to rest against the mouthpiece 3 of the telephone, when the phone is not in use. Thus, after each user completes a call and hangs up the telephone receiver, the mouthpiece 3 will rest against the disinfectant treated foam pad 14. Contact of the receiver 3 with the foam pad 14 will kill any bacteria on the mouthpiece 3, thus preventing a transmission of communicable diseases between individual phone users.

Figure 2:
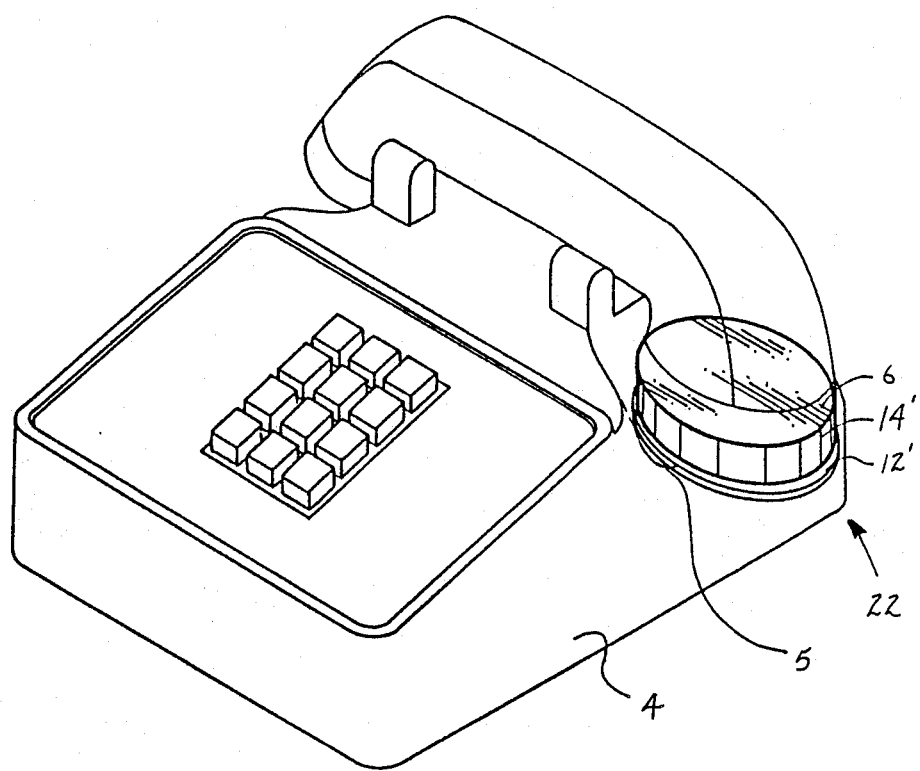
FIG. 2 is a perspective view of a desk style telephone provided with a telephone sanitation device according to a second embodiment of the present invention.

In FIG. 2, a second embodiment 22 of the telephone sanitation device of the present invention is illustrated. The foam support ring 12' is formed in a generally oval configuration and supports an oval disinfectant treated foam disc 14'. This configuration is required to enable the ring 12' to be secured by an adhesive backing on a base portion 5 of a desk type phone 4, in a position to contact the mouthpiece 6 of the telephone, when the phone is not in use.

In FIG. 3, a third embodiment 24 of the telephone sanitation device of the present invention is illustrated. The foam support base 12″ is formed in a rectangular configuration and supports an attached rectangular disinfectant treated foam block 14″. The mounting plate 12″ is adhesively secured in a location on the front face 8 of the wall type phone 7 such that the mouthpiece 9 of the phone 7 will rest against the disinfectant treated foam pad 14″, when the phone is not in use.

In FIG. 4, a top view of the first embodiment 10 of the present invention is provided. The foam support ring 12 is provided with a central circular aperture 16 and a radially outwardly extending removal tab 18. A cylindrical foam disc 14 is secured by a conventional means such as adhesive on a front face of the ring 12. An adhesive backing ring is secured on a back face of the ring 12.

In FIG. 5, a side view of the first embodiment 10 of the present invention is provided. The foam support ring 12 is provided with an adhesive backing 20 for securing the ring 12 and attached disinfectant treated foam disc 14 to the base of a telephone. The adhesive backing 20 may be of the type provided with a removable peel strip which is removed prior to securing the ring 12 to the phone base. When it is necessary to replace the foam pad 14, the ring 12 may be conveniently removed by grasping the tab 18 and lifting upwardly away from the telephone.

In FIG. 6, a cross sectional view of the first embodiment 10 is provided. The adhesive backing 20 is in the form of a cylindrical annular ring 20 which has a circular central aperture coaxially positioned with respect to a central circular aperture 16 formed through the support ring 12.

In FIG. 7, a perspective view of the first embodiment 10 of the telephone sanitation device of the present invention is provided.

In FIG. 8, a top view of the third embodiment 24 of the telephone sanitation device of the present invention is provided. The third embodiment 24 has a rectangular foam disinfectant treated block 14″ which is secured to a rectangular support base. The rectangular support base has a rectangular central aperture 16″ and an integrally formed removal tab 18″. The third embodiment 24 is also provided with an adhesive backing for securement to the base of a telephone.

In FIG. 9, a fourth embodiment 26 of a disinfectant foam pad according to the present invention is illustrated. The foam pad 26 has an outer layer 28 formed from a soft foam material. Three interior layers 30 are provided to hold a supply of a liquid disinfectant. The interior layers 30 are formed an absorbent fiber material such as cotton or felt. An adhesive backing layer 32 is provided for securing the pad 26 to the base of a telephone. In use, the interior absorbent layers 30 provide a continuous supply of disinfectant to the outer foam layer 28 through a wicking effect. The pad 26 may be folded, as illustrated, for packaging in a foil pouch.

With reference now to FIG. 10, a fifth embodiment of a telephone sanitation device according to the present invention will now be described. More specifically, the fifth embodiment 34 includes a holder 38 for holding disposable disinfectant treated foam pads. The holder 38 has an overhanging top rim 36 having a semicircular edge 40 which is connected to opposed straight overhanging edge side walls 42.

As shown in FIG. 11, the holder 38 is provided with an adhesive backing 44 for securement to the base of a telephone. A disposable disinfectant treated foam pad, which may be of the type illustrated in FIG. 9, without an adhesive backing layer, is received within the holder 38 and retained by the overhanging rim 36. When the disinfectant supply of the disposable foam pad has been exhausted, the foam pad is merely replaced by a new pad.

In FIG. 12, a sixth embodiment 46 of a telephone sanitation device according to the present invention utilizes a cylindrical cartridge type holder 48. The upper cylindrical portion of the cartridge holder 48 is secured by threads on a bottom mounting plate 50. The bottom mounting plate 50 is provided with an adhesive backing 52 for securement to the base of a telephone.

As shown in the exploded cross sectional view of FIG. 13, the bottom mounting plate 50 is provided with an upstanding cylindrical rim 68 having an externally threaded outer wall 70. A disinfectant treated foam pad 62 having a plurality of disinfectant storing absorbent layer 64 rests on the interior floor 66 of the mounting plate 50. The upper cylindrical cartridge holder portion 48 has a cylindrical inner wall 58 provided with cooperating threads 60. A radially inwardly extending annular rim 54 has a central circular aperture 56 for receipt of a telephone mouthpiece. The rim 54 abuts the outer top surface of the foam pad 62, and serves to retain the pad 62 against the floor 66. In use, the cartridge holder 48 is adhesively secured by virtue of the adhesive backing 52 to a telephone base in a position to receive the mouthpiece of the phone when not in use. The absorbent layers 64 store and continuously supply disinfectant to a soft foam pad 62. The mouthpiece of the telephone extends through the apertures 56 and rests against the foam pad 62 when not in use. The disposable pad 62 may be removed and replaced by unscrewing the upper cylindrical cartridge portion 48 from the mounting base plate 50.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A telephone sanitation device, comprising:
    a cylindrical holder having a circular mounting plate;
    an adhesive backing on said mounting plate for securing said holder to a telephone;
    an upstanding cylindrical portion provided with external threads integrally formed with said mounting plate;
    a removable upper cylindrical retainer provided with internal threads for cooperative engagement with said external threads;
    an internal annular rim in said cylindrical retainer;

a central cylindrical aperture encircled by said annular rim; and a disinfectant treated foam pad supported on said mounting plate and retained by said annular rim, said foam pad adapted to contact a telephone mouthpiece when not in use.

2. The telephone sanitation device of claim 1, wherein said disinfectant treated foam pad comprises an outer layer of a soft foam material; and a plurality of adjacent layers of a disinfectant treated absorbent material secured to said outer foam layer.

* * * * *